United States Patent
Schiwietz et al.

(10) Patent No.: US 7,961,945 B2
(45) Date of Patent: Jun. 14, 2011

(54) SYSTEM AND METHOD FOR ON-THE-FLY SEGMENTATIONS FOR IMAGE DEFORMATIONS

(75) Inventors: Thomas Schiwietz, Munich (DE); Joachim Georgii, Ismaning (DE); Rudiger Westermann, Karlsfeld (DE)

(73) Assignee: Technische Universität München, München (*) Notice: Subject to any disclaimer, the term of this patent is extended or adjusted under 35 U.S.C. 154(b) by 909 days.

(21) Appl. No.: 11/974,980

(22) Filed: Oct. 17, 2007

(65) Prior Publication Data

US 2008/0193013 A1  Aug. 14, 2008

Related U.S. Application Data

(60) Provisional application No. 60/889,662, filed on Feb. 13, 2007.

(51) Int. Cl.
*G06K 9/34* (2006.01)

(52) U.S. Cl. ........................ 382/173; 382/128

(58) Field of Classification Search .......... 382/173–180, 382/128–132
See application file for complete search history.

(56) References Cited

U.S. PATENT DOCUMENTS

| | | | |
|---|---|---|---|
| 6,714,664 B2* | 3/2004 | Kambe et al. | 382/113 |
| 6,798,415 B2* | 9/2004 | Lake et al. | 345/474 |
| 6,924,804 B2* | 8/2005 | Lake et al. | 345/473 |
| 7,116,330 B2* | 10/2006 | Marshall et al. | 345/474 |
| 7,146,297 B2* | 12/2006 | Marshall et al. | 703/6 |
| 7,148,899 B2* | 12/2006 | Dumesny et al. | 345/582 |
| 7,426,318 B2* | 9/2008 | Fu et al. | 382/294 |
| 7,472,354 B2* | 12/2008 | Jetha et al. | 715/781 |
| 7,529,397 B2* | 5/2009 | Wang et al. | 382/128 |
| 7,545,979 B2* | 6/2009 | Fidrich et al. | 382/173 |
| 7,639,848 B2* | 12/2009 | Qian et al. | 382/128 |
| 7,812,850 B1* | 10/2010 | Nelson | 345/619 |
| 7,822,274 B2* | 10/2010 | Sinop et al. | 382/173 |
| 2001/0000125 A1* | 4/2001 | Zimmerman et al. | 345/161 |
| 2001/0040984 A1* | 11/2001 | Kambe et al. | 382/113 |
| 2005/0059873 A1* | 3/2005 | Glozman et al. | 600/407 |
| 2006/0098897 A1* | 5/2006 | Dewaele | 382/294 |
| 2006/0274928 A1* | 12/2006 | Collins et al. | 382/132 |
| 2007/0041659 A1* | 2/2007 | Nobori et al. | 382/284 |
| 2007/0076924 A1* | 4/2007 | Fujii | 382/124 |
| 2007/0147700 A1* | 6/2007 | Jeong et al. | 382/266 |
| 2007/0189589 A1* | 8/2007 | Fidrich et al. | 382/128 |
| 2007/0297657 A1* | 12/2007 | Mattes et al. | 382/128 |
| 2008/0039713 A1* | 2/2008 | Thomson et al. | 600/411 |
| 2008/0062123 A1* | 3/2008 | Bell | 345/156 |

(Continued)

OTHER PUBLICATIONS

Gibson, S. F. und Mirtich, B. A survey of deformable models in computer graphics. *Technical Report TR-97-19*. s.l. : Mitsubishi, 1997.

(Continued)

*Primary Examiner* — Bhavesh M Mehta
*Assistant Examiner* — Sean Motsinger
(74) *Attorney, Agent, or Firm* — Donald B. Paschburg; F. Chau & Associates, LLC

(57) ABSTRACT

A method for on-the-fly segmentations for image deformations, includes: selecting an object in an image that is displayed on a computer screen; immediately after selecting the object, automatically segmenting the object to find a boundary of the object and marking an area inside the boundary undeformable and an area outside the boundary deformable; and dragging the object to a desired location in the image while the area inside the boundary remains stiff and the area outside the boundary deforms.

23 Claims, 5 Drawing Sheets

U.S. PATENT DOCUMENTS

| | | | | |
|---|---|---|---|---|
| 2008/0192049 A1* | 8/2008 | Schiwietz et al. | | 345/420 |
| 2008/0193013 A1* | 8/2008 | Schiwietz et al. | | 382/173 |
| 2008/0229222 A1* | 9/2008 | Kake | | 715/764 |
| 2008/0229223 A1* | 9/2008 | Kake | | 715/764 |
| 2009/0003676 A1* | 1/2009 | Li | | 382/131 |
| 2010/0201683 A1* | 8/2010 | Shirahata et al. | | 345/420 |
| 2011/0007959 A1* | 1/2011 | Schulz et al. | | 382/131 |

OTHER PUBLICATIONS

Terzopoulus, D. und Witkin, A. Physically based models with rigid and deformable components. *IEEE Computer Graphics & Applications*. 1988.

Baraff, D. und Witkin, A. Large steps in cloth simulation. *Proceedings of SIGGRAPH*. 1998.

Georgii, Joachim und Westermann, Rüdiger. A Multigrid Framework for Real-Time Simulation of Deformable Bodies. *Computer & Graphics*. 2006, Bd. 30, 3.

Grady, Leo. Random Walks for Image Segmentation. *IEEE Transactions on Patterns Analysis and Machine Intelligence*. 2006, Bd. 28, 11.

Grady, Leo, et al. Random Walks for interactive Organ Segmentation in Two and Three Dimensions: Implementation and Validation. *Proceedings of MICCAI*. 2005.

Grady, Leo and Funka-Lea, Gareth. Multi-Label Image Segmentation for Medical Applications Based on Graph-Theoretic Electrical Potentials. *Computer Vision and Mathematical Methods in Medical and Biomedical Image Analysis, ECCV*. Prague, Czech Republic : Springer, 2004.

Grady, Leo, et al. Random Walks for Interactive Alpha-Matting. *Proceedings of the Fifth IASTED International Conference on Visualization*. 2005.

J. Kruger and R. Westermann. Linear algebra operators for GPU implementation of numerical algorithms. *ACM Trans. Graph.*, 22(3): 908-916, 2003.

\* cited by examiner

SYSTEM AND METHOD FOR ON-THE-FLY SEGMENTATIONS FOR IMAGE DEFORMATIONS

CROSS-REFERENCE TO RELATED APPLICATION

This application claims the benefit of U.S. Provisional Application No. 60/889,662, filed Feb. 13, 2007, the disclosure of which is incorporated by reference herein in its entirety.

BACKGROUND OF THE INVENTION

1. Technical Field

The present invention relates to deforming images, and more particularly, to an on-the-fly system for interactive object recognition and deformation of images.

2. Discussion of the Related Art

Deforming images is a desirable feature in areas such as photograph manipulation and medical image registration. For example, dragging an object in an image stiffly to another position while the surrounding area deforms is a typical application in medical image registration. However, it is time-consuming and unintuitive to have a user segment the object and assign stiffness values manually before dragging the object.

Accordingly, there is a need for a technique that automates this process.

SUMMARY OF THE INVENTION

In an exemplary embodiment of the present invention, a method for on-the-fly segmentations for image deformations, comprises: selecting an object in an image that is displayed on a computer screen; immediately after selecting the object, automatically segmenting the object to find a boundary of the object and marking an area inside the boundary undeformable and an area outside the boundary deformable; and dragging the object to a desired location in the image while the area inside the boundary remains stiff and the area outside the boundary deforms.

The object is selected by moving a cursor using a mouse, depressing a button on the mouse at a click point in the object and not releasing the button. The click point is indicated by a dot on the computer screen.

The object is segmented by using an image segmentation algorithm that starts with a seed point at the click point. The image segmentation algorithm is a non-binary image segmentation algorithm. The non-binary image segmentation algorithm is a Random Walker algorithm.

The object is dragged to the desired location in the image while the mouse button is still depressed. The object is visualized by coloring the area inside the boundary and displaying the colored area on the computer screen.

The area inside the boundary is marked undeformable by assigning first stiffness values to pixels inside the boundary and the area outside the boundary is marked deformable by assigning second stiffness values to pixels outside the boundary, wherein the first stiffness values are greater than the second stiffness values. An image deformation algorithm that updates the assigned stiffness values in real-time is used to deform the area outside the boundary and keep the area inside the boundary stiff when the object is dragged to the desired location.

In an exemplary embodiment of the present invention, a system for on-the-fly segmentations for image deformations, comprises: a graphical user interface that displays an image in a window; an input device that enables a user to select an object in the image; and a computer module that includes: a segmentation engine that automatically segments the object to find a boundary of the object and marks an area inside the boundary undeformable and an area outside the boundary deformable, immediately after the object has been selected; and a deformation engine that deforms the area outside the boundary while the area inside the boundary remains stiff when the object is dragged to a desired location in the image.

The graphical user interface is displayed on a computer screen. The input device is a mouse. The object is selected by moving a cursor in the graphical user interface using the mouse, depressing a button on the mouse at a click point in the object and not releasing the button. The click point is indicated by a dot on the computer screen.

The segmentation starts with a seed point at the click point. The segmentation engine is a non-binary image segmentation algorithm. The non-binary image segmentation algorithm is a Random Walker algorithm.

The object is dragged to the desired location in the image while the mouse button is still depressed. The object is visualized by coloring the area inside the boundary and displaying the colored area on the computer screen.

The segmentation engine marks the area inside the boundary undeformable by assigning first stiffness values to pixels inside the boundary and marks the area outside the boundary deformable by assigning second stiffness values to pixels outside the boundary, wherein the first stiffness values are greater than the second stiffness values. The deformation engine updates the assigned stiffness values in real-time so that the area outside the boundary deforms while the area inside the boundary remains stiff when the object is dragged to the desired location.

In an exemplary embodiment of the present invention, a computer program product comprises a computer useable medium having computer program logic recorded thereon for on-the-fly segmentations for image deformations, the computer program logic comprising: program code for receiving a selection of an object in an image that is displayed on a computer screen; program code for automatically segmenting the object to find a boundary of the object and marking an area inside the boundary undeformable and an area outside the boundary deformable, immediately after receiving the selection; and program code for enabling the object to be dragged to a desired location in the image while the area inside the boundary remains stiff and the area outside the boundary deforms.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

This disclosure describes a system and method for on-the-fly segmentations for image deformations according to an exemplary embodiment of the present invention.

More specifically, an intuitive user interface for image deformation is described that allows a user to click an arbitrary object in an image and drag it to a desired location. Briefly, the system automatically finds the boundaries of the selected object in the image and marks it undeformable while the area surrounding the object (background) is marked deformable. Using mouse drags, the object can be moved stiffly to any position while the background deforms. Exemplary embodiments of the present invention will now be described in detail with reference to the accompanying drawings.

Figure 1:
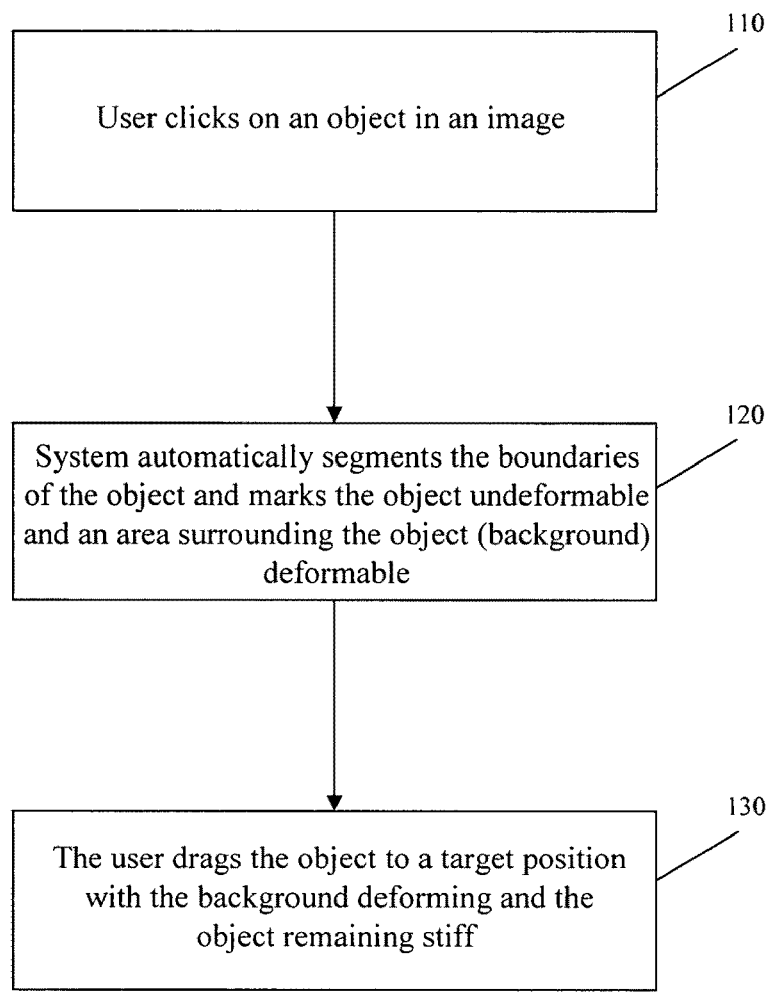
FIG. 1 is a flowchart illustrating a method for on-the-fly segmentations for image deformations according to an exemplary embodiment of the present invention.
Figure 2:
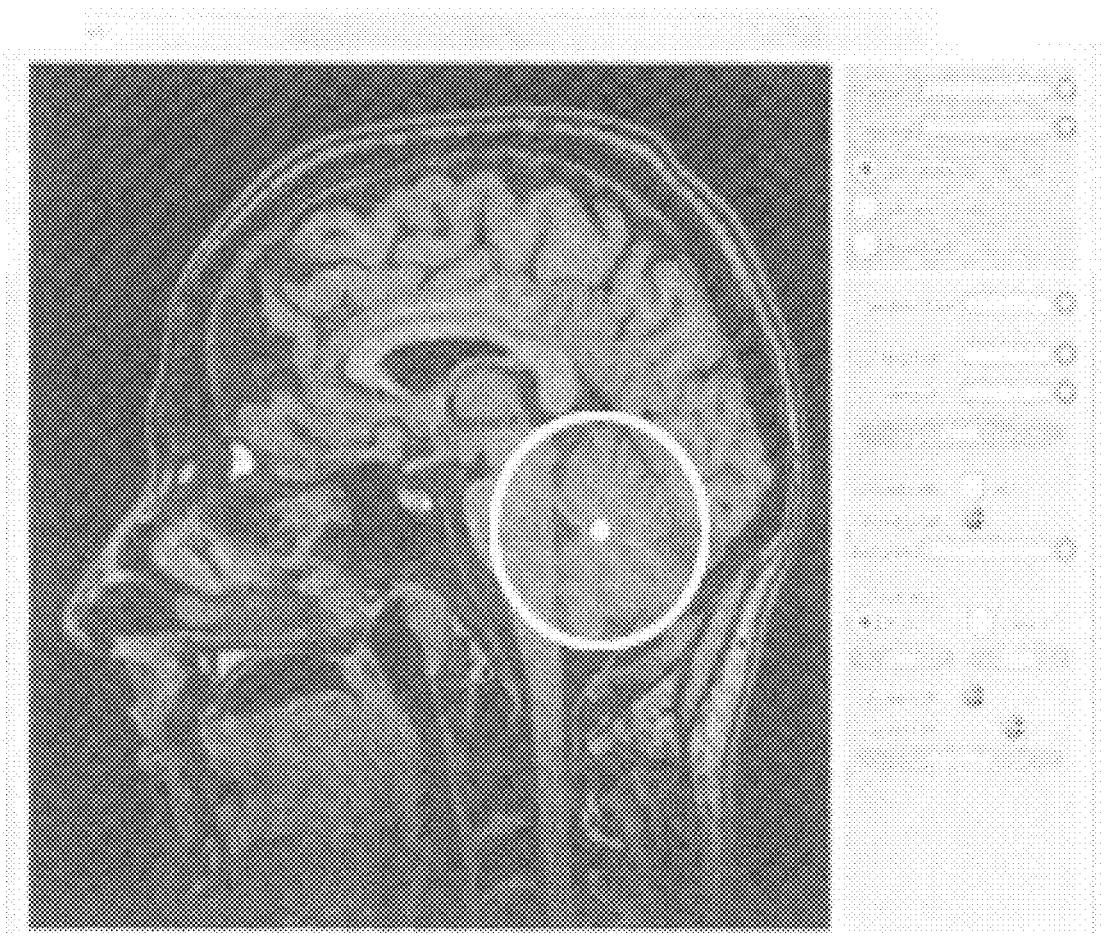
FIG. 2 is an image illustrating clicking on an object in an image according to an exemplary embodiment of the present invention.

In a first step of a method for on-the-fly segmentations for image deformations (as shown in FIG. 1), a user clicks on an object in an image without releasing the mouse button (110). An example of this is shown in FIG. 2. In FIG. 2, the selected object is bounded by a circle and the click point is indicated by a dot within the circle. The dot may be colored. It is to be understood that the object may be selected by using other pointing devices such as a stylus pen.

Figure 3:
FIG. 3 is an image illustrating an on-the-fly segmentation of an object and stiffness values assignment according to an exemplary embodiment of the present invention.

Instantaneously, the system starts a segmentation algorithm with a seed point at the click point to find the object's boundary and mark the object deformable and the background undeformable (120). Here, the Random Walker algorithm is used since it runs so fast that the user does not notice the segmentation process. The segmented object is visualized in the image as shown in FIG. 3. In FIG. 3, the segmented object is visualized in white. However, the segmented object can be viewed in any color that is capable of distinguishing it from surrounding structures.

After the segmentation, large stiffness values are assigned to pixels in the white area while small stiffness values are assigned to pixels in the background (i.e., pixels not in the white area). In other words, the segmentation result from the Random Walker algorithm is applied to a grid of finite elements representing the image and stiffness values are assigned to each of the finite elements.

In general, any segmentation algorithm can be used for the aforementioned tasks. For our purposes, however, a non-binary segmentation algorithm provides attractive properties since its segmentation result yields a smooth transition between the segmented object and the background. This is highly desirable for stiffness assignments because the segmentation can be mapped directly to stiffness using a transfer function. In this way, we can avoid abrupt stiffness changes in a simulation grid at no extra cost. This feature is especially suited to generate visually pleasant deformations at boundary transitions.

The Random Walker algorithm falls into the category of non-binary segmentation algorithms. It is fast, easy to implement on a graphics processing unit (GPU) and numerically stable. In the following, we will give a brief overview of this algorithm and explain how to extend it to work on color images. For a more in-depth discussion of the Random Walker see L. Grady and G. Funka-Lea. Multi-label image segmentation for medical applications based on graph-theoretic electrical potentials. In ECCV 2004 Workshops CVAMIA and MMBIA, pages 230-245, 2004, the disclosure of which is incorporated by reference herein in its entirety.

The Random Walker algorithm is started on an image that contains a number of seed pixels indicating the object to segment. Given a random walker starting at every other pixel the probability that this walker reaches one of the seeded pixels is computed. The probability that the random walker travels into a particular direction is determined by the image structure. The change in pixel intensity is a measure for the probability by which a random walker crosses over to a neighboring pixel. Therefore, there is a high likelihood for a random walker to move inside the segmented object, but a low likelihood to cross the object's boundary. Multiplying probabilities computed along the paths from pixels to seed points yields a probability distribution representing a non-binary segmentation.

To use the Random Walker algorithm on color images we first convert RGB pixel values in the image to intensity values using the procedure proposed in L. Grady, T. Schiwietz, S. Aharon, and R. Westermann. Random walks for interactive alpha-matting. In Proceedings of the Fifth IASTED International Conference on Visualization, Imaging and Image Processing, pages 423-429, Benidorm, Spain, September 2005. ACTA Press, the disclosure of which is incorporated by reference herein in its entirety. Pixel values are first transformed to the Lab color space and the Euclidean length of the Lab vector length is used as an intensity. Next, a function to express the probability is defined to map changes in image intensities to crossing weights.

The principle idea is to express random walks by a system of linear equations instead of simulating the random walk itself as described in S. Kakutani. Markov processes and the Dirichlet problem. Proc. Jap. Acad., 21:227-233, 1945. With the seed points as boundary conditions the problem can be posed as the solution of a sparse, symmetric, positive-definite system of linear equations.

To make this solution fast, and thus to enable the use of the Random Walker algorithm in real-time applications, numerical GPU-solvers can be used as demonstrated in J. Krüger and R. Westermann. Linear algebra operators for GPU implementation of numerical algorithms. ACM Trans. Graph., 22(3): 908-916, 2003, the disclosure of which is incorporated by reference herein in its entirety. In the current work, we may employ a GPU conjugate gradient method that enables segmentation of high-resolution images within milliseconds.

Figure 4:
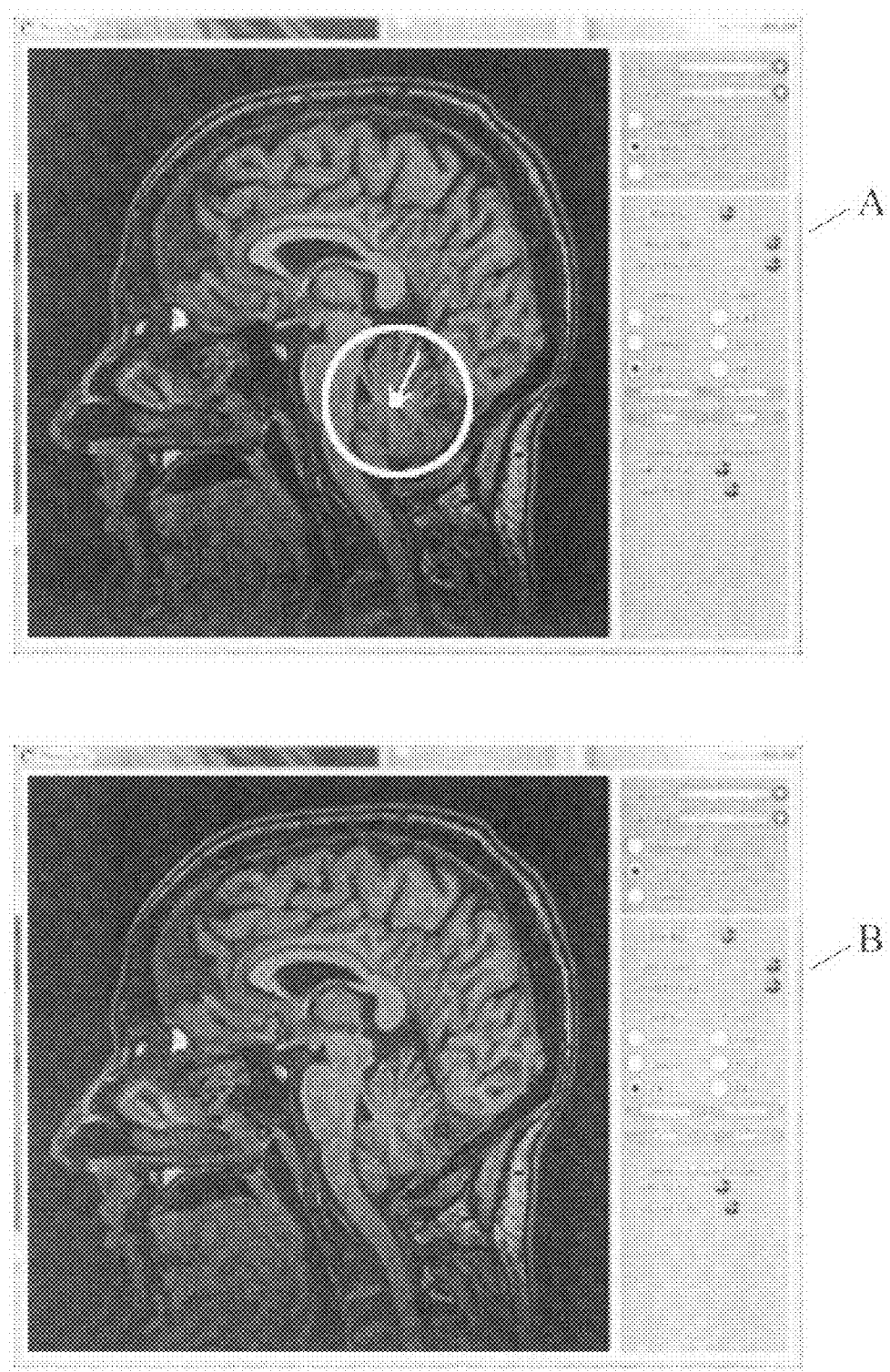
FIG. 4 is a pair of images illustrating a object being dragged to a target location while the object remains stiff and an area surrounding the object deforms according to an exemplary embodiment of the present invention.

Referring again to FIG. 1, once the object's boundaries are segmented and the stiffness values assigned, the user can drag the segmented object to any target location while the object remains stiff and the background deforms based on the stiffness value assignment (130). An example of this is shown in FIG. 4. In FIG. 4, the previously segmented object (as shown in image A) is dragged to a target location (as shown in image B). Image B also shows that the segmented object remains in shape while the background deforms. Note that the user still has not released the mouse button from the initial click. Thus, the user starts dragging without time delay from the segmentation process and stiffness update. Since the deformation engine supports fast stiffness updates and runs in real-time, the updated image deformation follows the mouse movement without time delay.

The deformation engine may be any type of deformation algorithm that supports stiffness parameters on a per-pixel basis. An example of such an algorithm is described in Georgii, Joachim and Westermann, Rüdiger. A Multigrid Framework for Real-Time Simulation of Deformable Bodies. Computer & Graphics. 2006, Bd. 30, 3, the disclosure of which is incorporated by reference herein in its entirety.

Figure 5:
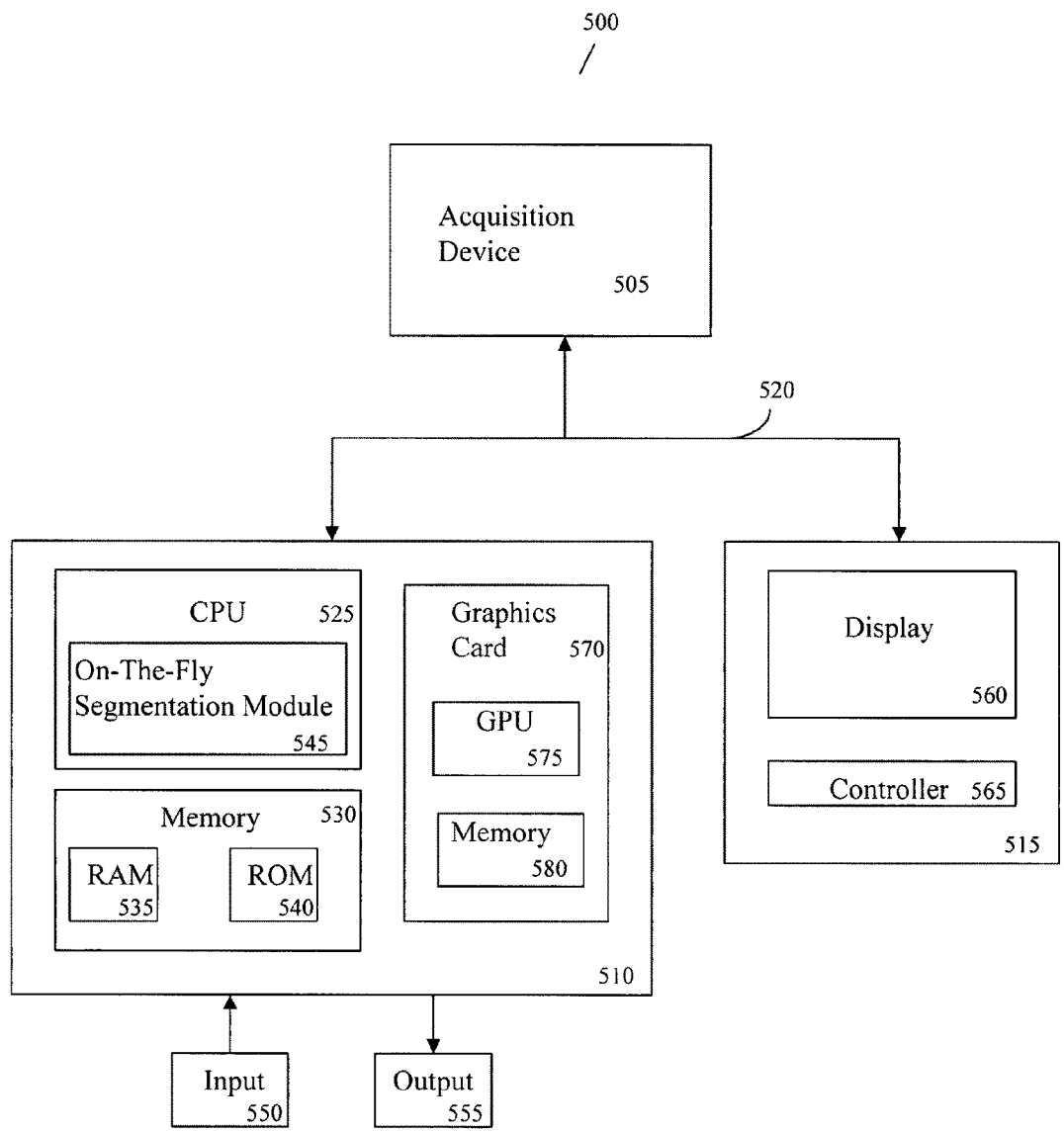
FIG. 5 is a block diagram illustrating a system in which an exemplary embodiment of the present invention may be implemented.

FIG. 5 shows a system in which an exemplary embodiment of the present invention may be implemented. In FIG. 5, a system 500 includes an acquisition device 505, a personal computer (PC) 510 and an operator's console 515 connected over a wired or wireless network 520. The acquisition device 505 may be a CT imaging device or any other three-dimensional (3D) high-resolution imaging device such as a magnetic resonance (MR) scanner or ultrasound scanner. The acquisition device 505 may also be a flatbed scanner that takes in an optical image and digitizes it into an electronic image represented as binary data to create a computerized version of a photo or illustration.

The PC 510, which may be a portable or laptop computer, a medical diagnostic imaging system or a picture archiving communications system (PACS) data management station, includes a central processing unit (CPU) 525, a memory 530 and a graphics card 570 which are connected to an input device 550 and an output device 555. The CPU 525 includes an on-the-fly segmentation module 545 that includes software for executing methods in accordance with an exemplary embodiment of the present invention. Although shown inside the CPU 525, the on-the-fly segmentation module 545 can be located in the graphics card 570.

The memory 530 includes a random access memory (RAM) 535 and a read-only memory (ROM) 540. The memory 530 can also include a database, disk drive, tape drive, etc., or a combination thereof. The RAM 535 functions as a data memory that stores data used during execution of a program in the CPU 525 and is used as a work area. The ROM 540 functions as a program memory for storing a program executed in the CPU 525. The input 550 is constituted by a keyboard, mouse, etc., and the output 555 is constituted by a liquid crystal display (LCD), cathode ray tube (CRT) display, printer, etc.

The graphics card 570, which is used to take binary data from the CPU 525 and turn it into an image, includes a GPU 575 and a memory 580. The GPU 575 determines what to do with each pixel to be displayed, for example, on the output device 555 or a display 560 of the operator's console 515. In operation, the GPU 575 makes a 3D image by first creating a wire frame out of straight lines, rasterizing the image and adding lighting, texture and color to the 3D image. The memory 580, which may be a RAM, holds information regarding each pixel and temporarily stores completed images. Although not shown, the graphics card 570 also includes a connection to a motherboard, which also holds the CPU 525, for receiving data and power and a connection to the output device 555 for outputting the picture. The memory 580 could be included in the GPU 575 or the GPU 575 could include its own memory for performing storage tasks.

The operation of the system 500 can be controlled from the operator's console 515, which includes a controller 565, e.g., a keyboard, and a display 560. The operator's console 515 communicates with the PC 510 and the acquisition device 505 so that image data collected by the acquisition device 505 can be rendered by the PC 510 and viewed on the display 560. The PC 510 can be configured to operate and display information provided by the acquisition device 505 absent the operator's console 515, by using, e.g., the input 550 and output 555 devices to execute certain tasks performed by the controller 565 and display 560.

The operator's console 515 may further include any suitable image rendering system/tool/application that can process digital image data of an acquired image dataset (or portion thereof) to generate and display images on the display 560. More specifically, the image rendering system may be an application that provides rendering and visualization of medical image data, and which executes on a general purpose or specific computer workstation. The PC 510 can also include the above-mentioned image rendering system/tool/application.

It is to be understood that the present invention may have many applications. In one application, the present invention may be employed in photograph manipulation which is something that is particularly desired by members of the Photoshop community. For example, one might want to move objects to another position in an image or to bend objects. In another application such as medical image deformation, the present invention can be used to register two medical images manually. For example, by clicking an organ, the organ gets segmented instantly and the user can drag it to a location while the organ remains stiff and the background deforms. This can be useful for manual registration correction. The present invention can also be applied to arbitrary images.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

In addition, the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for on-the-fly segmentations for image deformations, comprising:

selecting an object in an image that is displayed on a computer screen;

immediately after selecting the object, automatically segmenting the object to find a boundary of the object and marking an area inside the boundary undeformable and an area outside the boundary deformable; and dragging the object to a desired location in the image while the area inside the boundary remains stiff and the area outside the boundary deforms.

2. The method of claim 1, wherein the object is selected by moving a cursor using a mouse, depressing a button on the mouse at a click point in the object and not releasing the button.

3. The method of claim 2, wherein the click point is indicated by a dot on the computer screen.

4. The method of claim 2, wherein the object is segmented by using an image segmentation algorithm that starts with a seed point at the click point.

5. The method of claim 4, wherein the image segmentation algorithm is a non-binary image segmentation algorithm.

6. The method of claim 5, wherein the non-binary image segmentation algorithm is a Random Walker algorithm.

7. The method of claim 2, wherein the object is dragged to the desired location in the image while the mouse button is still depressed.

8. The method of claim 1, wherein the object is visualized by coloring the area inside the boundary and displaying the colored area on the computer screen.

9. The method of claim 1, wherein the area inside the boundary is marked undeformable by assigning first stiffness values to pixels inside the boundary and the area outside the boundary is marked deformable by assigning second stiffness values to pixels outside the boundary, wherein the first stiffness values are greater than the second stiffness values.

10. The method of claim 9, wherein an image deformation algorithm that updates the assigned stiffness values in real-time is used to deform the area outside the boundary and keep the area inside the boundary stiff when the object is dragged to the desired location.

11. A system for on-the-fly segmentations for image deformations, comprising:

a graphical user interface that displays an image in a window;

an input device that enables a user to select an object in the image; and a computer that includes:

a segmentation engine that automatically segments the object to find a boundary of the object and marks an area inside the boundary undeformable and an area outside the boundary deformable, immediately after the object has been selected; and a deformation engine that deforms the area outside the boundary while the area inside the boundary remains stiff when the object is dragged to a desired location in the image.

12. The system of claim 11, wherein the graphical user interface is displayed on a computer screen.

13. The system of claim 12, wherein the input device is a mouse.

14. The system of claim 13, wherein the object is selected by moving a cursor in the graphical user interface using the mouse, depressing a button on the mouse at a click point in the object and not releasing the button.

15. The system of claim 14, wherein the click point is indicated by a dot on the computer screen.

16. The system of claim 14, wherein the segmentation starts with a seed point at the click point.

17. The system of claim 16, wherein the segmentation engine is a non-binary image segmentation algorithm.

18. The system of claim 17, wherein the non-binary image segmentation algorithm is a Random Walker algorithm.

19. The system of claim 14, wherein the object is dragged to the desired location in the image while the mouse button is still depressed.

20. The system of claim 12, wherein the object is visualized by coloring the area inside the boundary and displaying the colored area on the computer screen.

21. The system of claim 11, wherein the segmentation engine marks the area inside the boundary undeformable by assigning first stiffness values to pixels inside the boundary and marks the area outside the boundary deformable by assigning second stiffness values to pixels outside the boundary, wherein the first stiffness values are greater than the second stiffness values.

22. The system of claim 21, wherein the deformation engine updates the assigned stiffness values in real-time so that the area outside the boundary deforms while the area inside the boundary remains stiff when the object is dragged to the desired location.

23. A computer program product comprising a non transitory computer readable medium having computer program logic recorded thereon for on-the-fly segmentations for image deformations, the computer program logic comprising:

program code for receiving a selection of an object in an image that is displayed on a computer screen;

program code for automatically segmenting the object to find a boundary of the object and marking an area inside the boundary undeformable and an area outside the boundary deformable, immediately after receiving the selection; and program code for enabling the object to be dragged to a desired location in the image while the area inside the boundary remains stiff and the area outside the boundary deforms.

* * * * *